July 22, 1958     F. DIAZ CASCAJARES     2,844,051
AUTOMATIC TRANSMISSION

Filed Aug. 14, 1953     9 Sheets-Sheet 1

FIG. I

INVENTOR.
Federico Diaz Cascajares
BY Michael S. Striker
Attorney

July 22, 1958  F. DIAZ CASCAJARES  2,844,051
AUTOMATIC TRANSMISSION

Filed Aug. 14, 1953  9 Sheets-Sheet 2

INVENTOR.
Federico Diaz Cascajares
BY Michael S. Striker
Attorney

INVENTOR.
Federico Diaz Cascajares
BY Michael S. Striker
Attorney

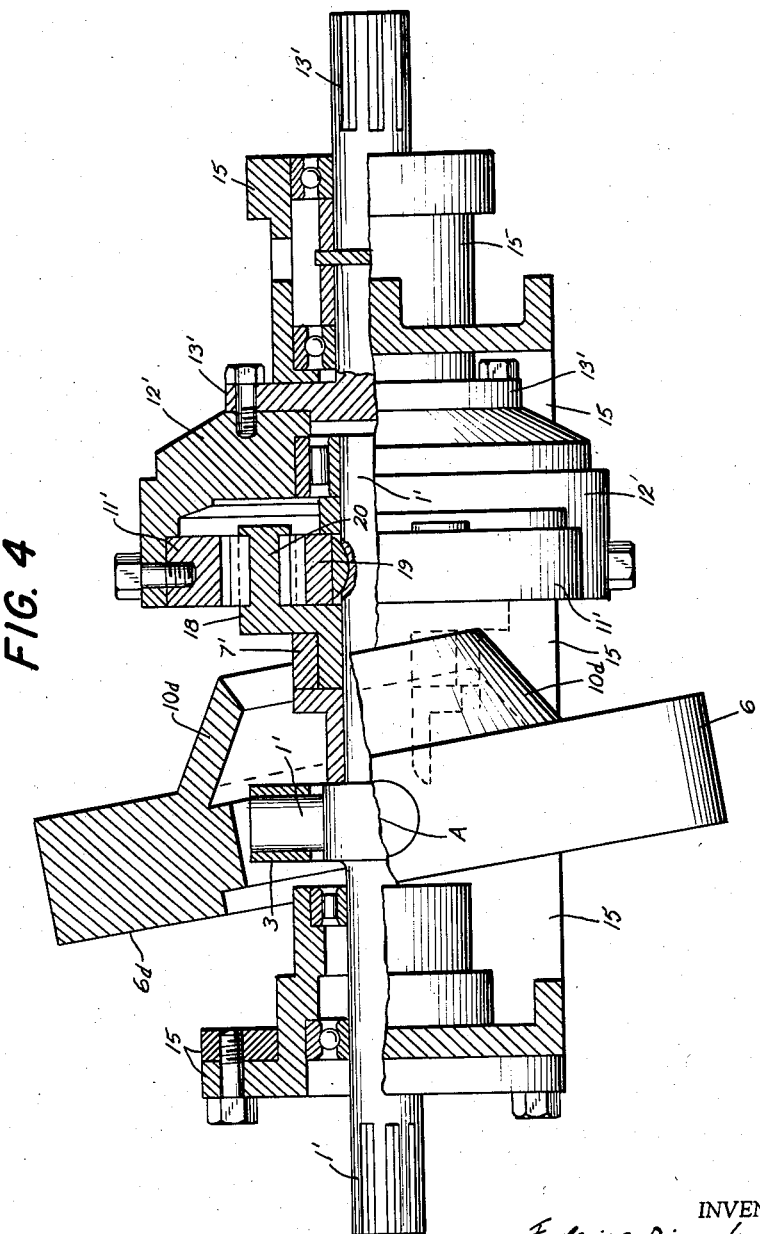

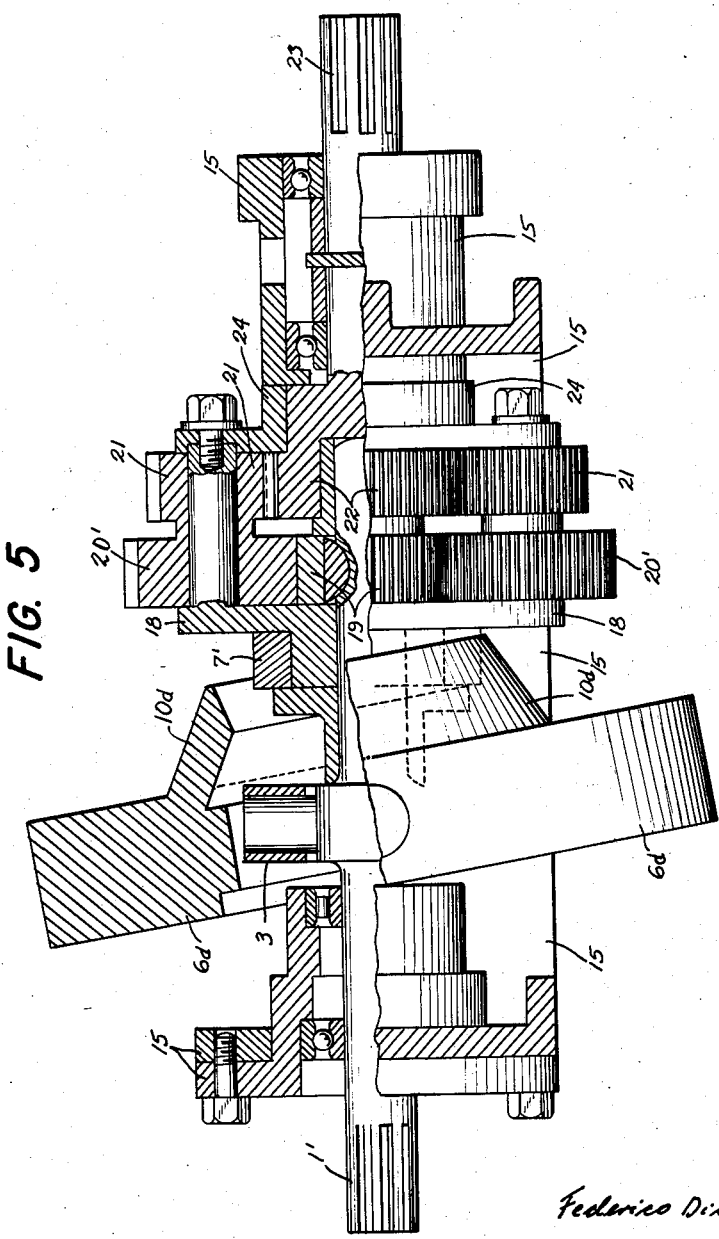

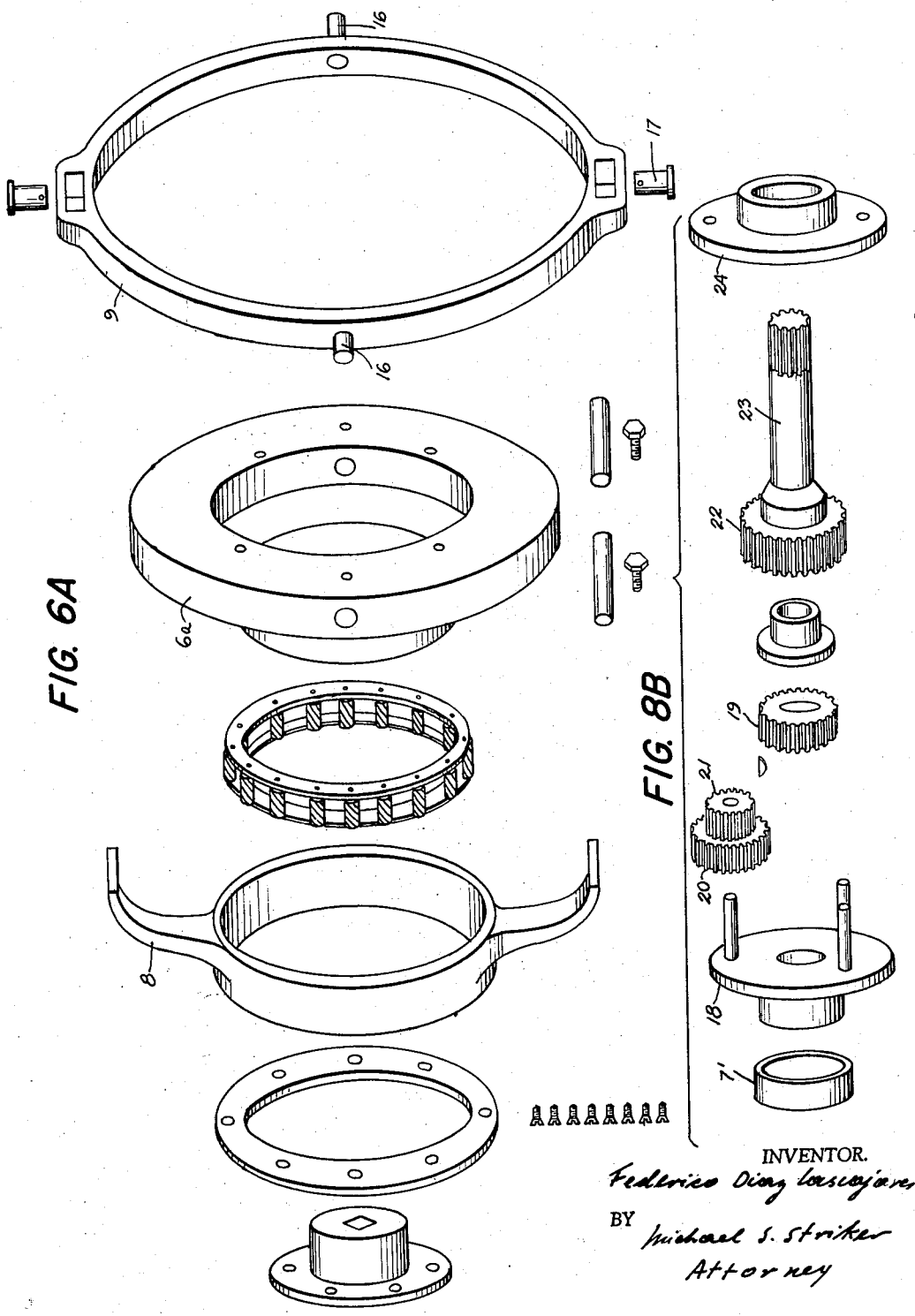

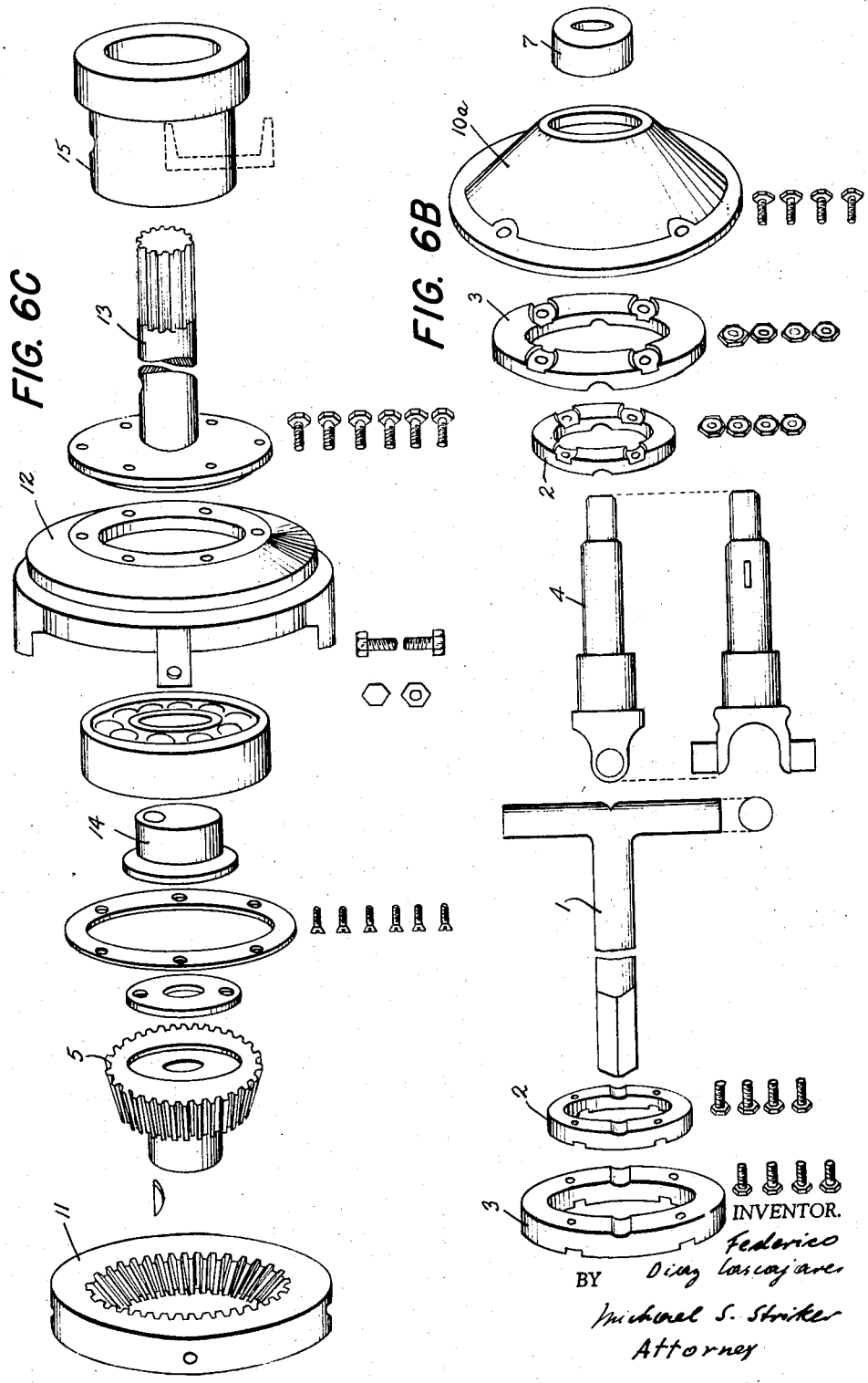

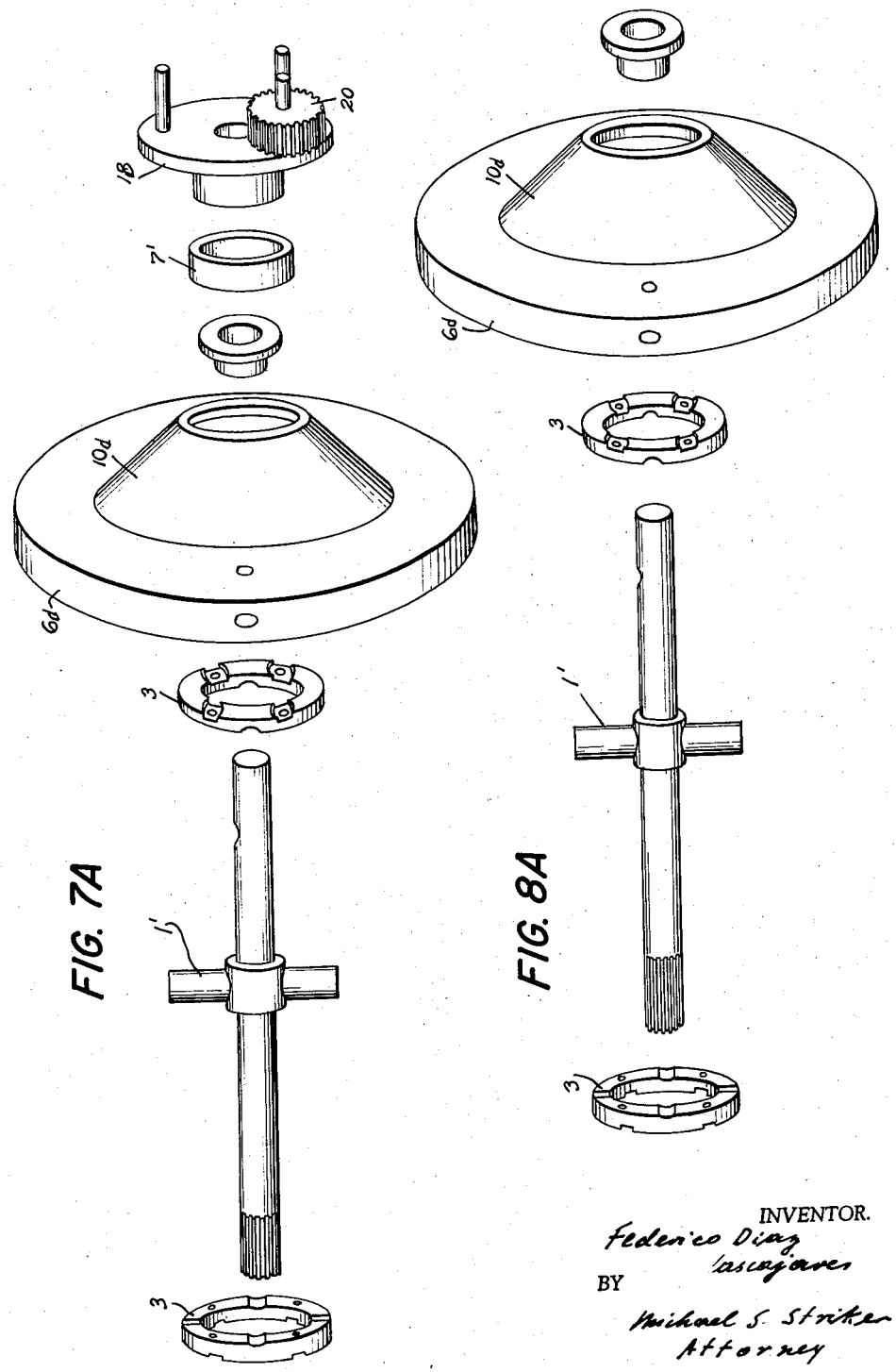

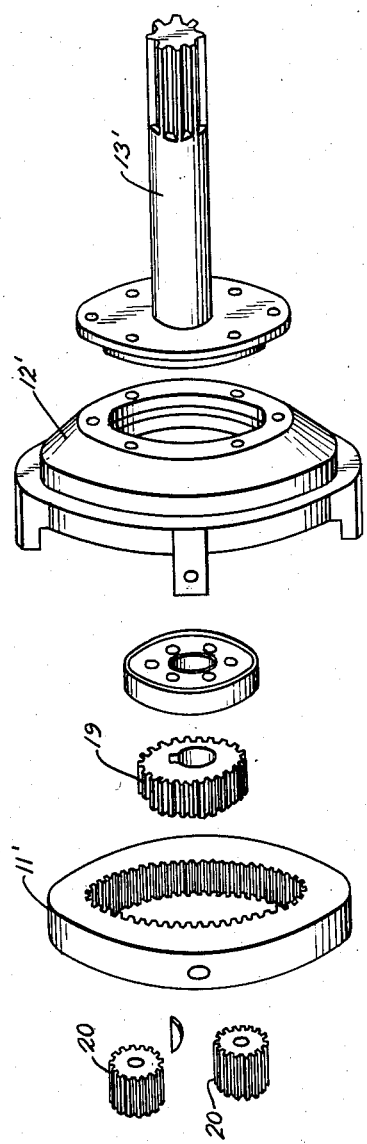

United States Patent Office 2,844,051
Patented July 22, 1958

2,844,051

AUTOMATIC TRANSMISSION

Federico Diaz Cascajares, Seville, Spain

Application August 14, 1953, Serial No. 374,388

Claims priority, application Spain August 20, 1952

10 Claims. (Cl. 74—751)

The present invention relates to automatic transmissions of the type used, for example, in vehicles for transmitting a drive from the engine of the vehicle to the drive wheels.

One of the objects of the present invention is to provide a transmission which is made up only of mechanical motion transmitting members and which does not transmit a drive through a fluid medium of any type.

Another object of the present invention is to provide an automatic transmission which is capable of producing an infinite number of speed relationships between the driving and driven shafts of the transmission in a continuous, progressive, and fully automatic manner.

A further object of the present invention is to provide an automatic transmission which produces automatic control through the medium of a flywheel which acts as a gyroscope rotor.

An additional object of the present invention is to provide an automatic transmission which is capable of easily being combined with auxiliary devices such as reversing gears or devices for maintaining the transmission in a direct drive position or in a position where no power can be transmitted to the driven shaft.

Still another object of the present invention is to provide an automatic transmission which is made up of relatively few, simple, and ruggedly constructed parts composed of materials which are easily obtainable.

With the above objects in view the present invention mainly consists of a transmission apparatus which includes a support means and drive and driven shafts both of which are mounted for rotation about their axes on the support means. A first gear is connected to the driven shaft for for rotation therewith, and a second gear meshes with the first gear and is operatively connected to the drive shaft to be rotated thereby. A mounting means is provided to mount the second gear for free rolling movement around the first gear, and a restraining means is provided for gradually restraining the second gear against free rolling movement along the first gear as the speed of rotation of the drive shaft increases so that the second gear drives the first gear and the driven shaft therewith as the speed of rotation of the drive shaft increases.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 4 is a partly sectional, side view of a fourth embodiment of a transmission apparatus constructed in accordance with the present invention;

Fig. 5 is a partly sectional, side view of still another embodiment of a transmission apparatus construction in accordance with the present invention;

Figure 1:
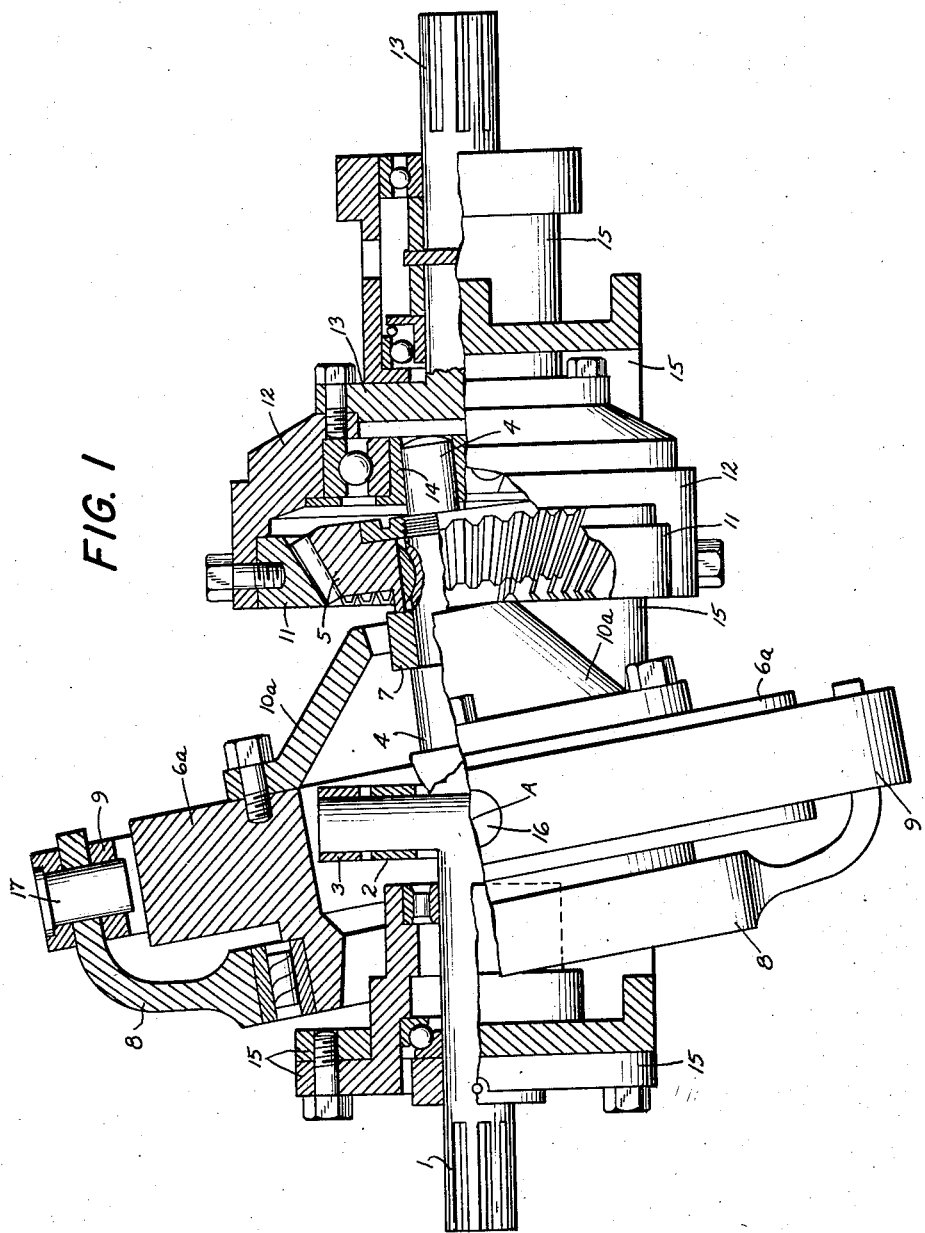
Fig. 1 is a partly sectional, side view of a transmission apparatus constructed in accordance with the present invention.

Figs. 6A, 6B and 6C together are an exploded view of the several parts which form the transmission apparatus of Fig. 1;

Figs. 7A and 7B together form an exploded view of the transmission apparatus of Fig. 4; and Figs. 8A and 8B together form an exploded view of the transmission apparatus of Fig. 5.

Referring now to Fig. 1 of the drawings, the apparatus of the invention includes a drive shaft 1 connected to any suitable engine or the like in any suitable way so as to be driven by the crank shaft of the engine, although, if desired, the shaft 1 may be driven by an electric motor or the like. As may be seen from Fig. 6B, the drive shaft 1 is T-shaped and is formed by a first elongated leg whose axis coincides with the axis of rotation of the drive shaft and a second leg crossing over the right end of the drive shaft, as viewed in Figs. 1 and 6B, and being normal to the first leg. Thus, the axes of the two legs of the drive shaft 1 are normal to each other and intersect each other at the point A shown in Fig. 1.

An inner ring 2, which forms part of a universal joint, is connected to the second leg of drive shaft 1, and Fig. 6B shows how the ring 2 is made of a pair of circular halves provided with grooves through which the opposite ends of the second leg of shaft 1 freely extend, these halves of ring 2 being interconnected by screws or the like so that the ring 2 is constrained to rotate with the shaft 1 and at the same time is free to turn about the axis of the second leg at the right end of shaft 1, as viewed in Fig. 1.

An outer ring 3 of a second universal joint is connected to this second leg of shaft 1 in the same way that the ring 2 is connected thereto, this outer ring 3 having the same construction as ring 2 but being of a larger size than the same, as is evident from Fig. 6B. The ring 3 thus extends about the ring 2 and is constrained to rotate together with the shaft 1 while at the same time being free to turn about the axis of the second leg of shaft 1 located at the right end thereof, as viewed in Fig. 1.

As is evident from Fig. 6B, a shaft 4 is provided with a pair of cylindrical integral pivot pins at its left end, as viewed in Fig. 6B, and these pivot pins are turnably located in cylindrical openings formed by the two halves of ring 2 and located along an axis which is normal to the axes of both legs of drive shaft 1 and which passes through the point A. Thus, the shaft 4 is universally connected to the shaft 1 for free movement in all direction with respect to the same while at the same time being constrained to rotate together with the shaft 1.

A planetary gear 5 of a differential drive is fixed to the shaft 4 for rotation therewith in any suitable way, as by being keyed thereto in the manner shown in Fig. 1, this planetary gear being beveled and acting as a pinion, as will be pointed out below.

A flywheel in the form of an annular weight 6a is located about the drive shaft 1 and has its center of gravity located at the point A. A pair of pivot pins, shown beneath flywheel 6a in Fig. 6A, are fixed to the flywheel 6a and extend into cylindrical openings formed by the two halves of ring 3 and located along an axis normal to the axes of both legs of shaft 1 and passing through point A so that in this way the flywheel 6a is universally mounted for free movement in all directions about the shaft 1 while maintaining the center of gravity of the annular flywheel 6a at the point A.

A ring 7 is freely located on the shaft 4, as shown in Fig. 1.

A roller bearing 8 whose construction is most clearly shown in Fig. 6A engages an annular projection of the annular flywheel 6a and has a pair of legs which are pivotally connected by pins 17 to a ring 9 extending with clearance about the flywheel 6a and having a pair of pivot pins 16 which are turnably mounted in a stationary frame 15 forming a support means for the entire apparatus. Thus, the annular flywheel 6a is universally mounted on the shaft 1 and support 15 while being constrained to rotate with the shaft 1.

A funnel-shaped member 10a is fixed at the larger of its open ends to the annular flywheel 6a and is concentric with the latter, the smaller of the open ends of member 10a having its inner periphery extending with a predetermined clearance about ring 7 for a purpose described below.

An internal ring gear 11 having inner peripheral beveled teeth and being of a larger diameter than planetary gear 5 is fixed to a hollow head piece 12 which is in turn fixed to the enlarged left end of the driven shaft 13 which is coaxial with the drive shaft 1 and which is connected through any suitable gears or the like to the drive wheels of the vehicle, for example. As is apparent from Fig. 1 the stationary supporting frame 15 is provided with suitable roller and ball bearings which turnably support drive shaft 1 and driven shaft 13 for rotation about their axes. Frame 15 may be in the form of an enclosed housing containing a lubricant for the apparatus.

A cylindrical bearing block 14, shown most clearly in Fig. 6C, is supported for free rotation about its axis by a suitable ball bearing located in the head piece 12, the axis of the bearing block 14 being coincident with the axis of the driven shaft 13. The bearing block 14 is formed with a bore whose axis is inclined to the axes of shafts 1 and 13 and whose axis passes through the point A. The right free end of shaft 4, as viewed in Fig. 1, extends into the bore of bearing block 14, which is preferably made of bronze, and slidably engages the bearing block 14 so that the latter forms a bearing for shaft 4 and maintains the axis thereof passing through the point A while at the same time maintaining the planetary gear 5 at all times in mesh with the gear 11.

The above described apparatus operates as follows:

If the engine driving the shaft 1 turns at a relatively low speed, as when the engine is idling so as to produce very little power, then the flywheel 6a turns slowing together with the drive shaft. As a result of the low power and slow speed of rotation of the flywheel 6a, the latter cannot prevent the planetary gear 5 from rolling freely along the teeth of the ring gear 11 so that at this time the axis of shaft 4 describes a cone whose apex is located at the point A. The gear 11 which is fixed through the driven shaft 13 to the drive wheels of the vehicle, for example, remains stationary at this time together with the vehicle.

If the motor is accelerated so as to produce more power, then the speed of rotation of the annular flywheel 6a multiplies together with the speed of rotation of shaft 1, and as a result of its increased speed of rotation the flywheel 6a approaches a predetermined stabilized position since this flywheel acts as a gyroscope rotor. As a result, the periphery of the smaller open end of the funnel-shaped member 10a engages the ring 7 and resists free turning movement of shaft 4 through the cone described by its axis as well as free rolling movement of gear 5 around gear 11. Thus, the tendency of flywheel 6a to approach a predetermined stabilized position as the speed of rotation of shaft 1 increases causes the member 10a to press with a constantly increasing force against the ring 7 to gradually restrain members 4 and 5 against free movement in translation about the axis of shafts 1 and 13 so that the free rolling movement of gear 5 is prevented to a certain extent and as a result the gear 11 starts to turn to also turn the shaft 13.

With increasing speeds of shaft 1 and with the added inertia derived from the moving vehicle, a final position of direct drive is reached at which the shaft 4 only rotates about its own axis so that the gear 5 turns the gear 11 at a speed which corresponds to direct drive.

The regulating and controlling force depends on the speed of rotation on the drive shaft 1 and therefore on the speed of rotation on the crank shaft of the engine connected to the drive shaft 1, and in addition the controlling force is influenced by the resistance produced by the vehicle through the shaft 13. The speed relationships between drive shaft 1 and driven shaft 13 are controlled in a permanent, constant, progressive, and automatic manner. The number of speed relationships, that is the number of speed positions, is infinite so that the changes in the transmission ratio take place in a smooth, automatic and continuous manner.

The described apparatus is not reversible since while the drive shaft 1 is capable of driving the driven shaft 13, the latter cannot drive the drive shaft 1.

Figure 2:
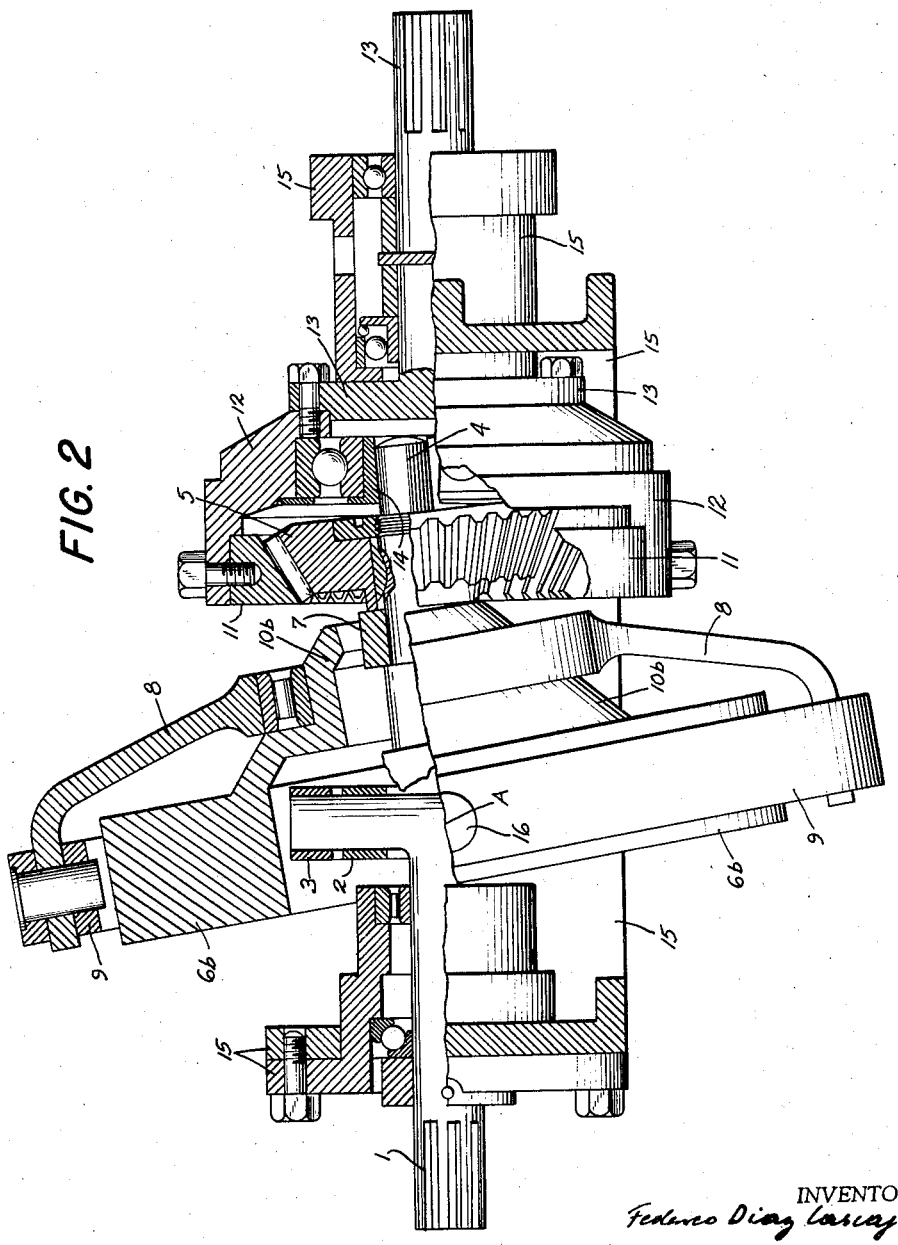
Fig. 2 is a partly sectional, side view of a slightly different embodiment of a transmission apparatus constructed in accordance with the present invention.

A slight variation and technically improved form of the structure of Fig. 1 is shown in Fig. 2 which is identical with Fig. 1 except that the annular projection at the left side of the flywheel 6a of Fig. 1 is omitted. Instead the flywheel 6b of Fig. 2 is provided with an annular portion integral with the hollow funnel-shaped member 10b and the flywheel 6b and cooperating with the bearing 8 which is connected to the ring 9 in the same way as bearing 8 of Fig. 1, except that the bearing 8 of Fig. 2, which is substantially identical with the bearing 8 of Fig. 1, is located on the same side of the flywheel 6b as the funnel-shaped member 10b. Thus, the funnel-shaped member 10b of Fig. 2 serves the dual purpose of serving as a race for the rollers of bearing 8 and at the same time cooperating with ring 7 to restrain the free movement in translation of members 4 and 5 about the axis of shafts 1 and 13.

Figure 3:
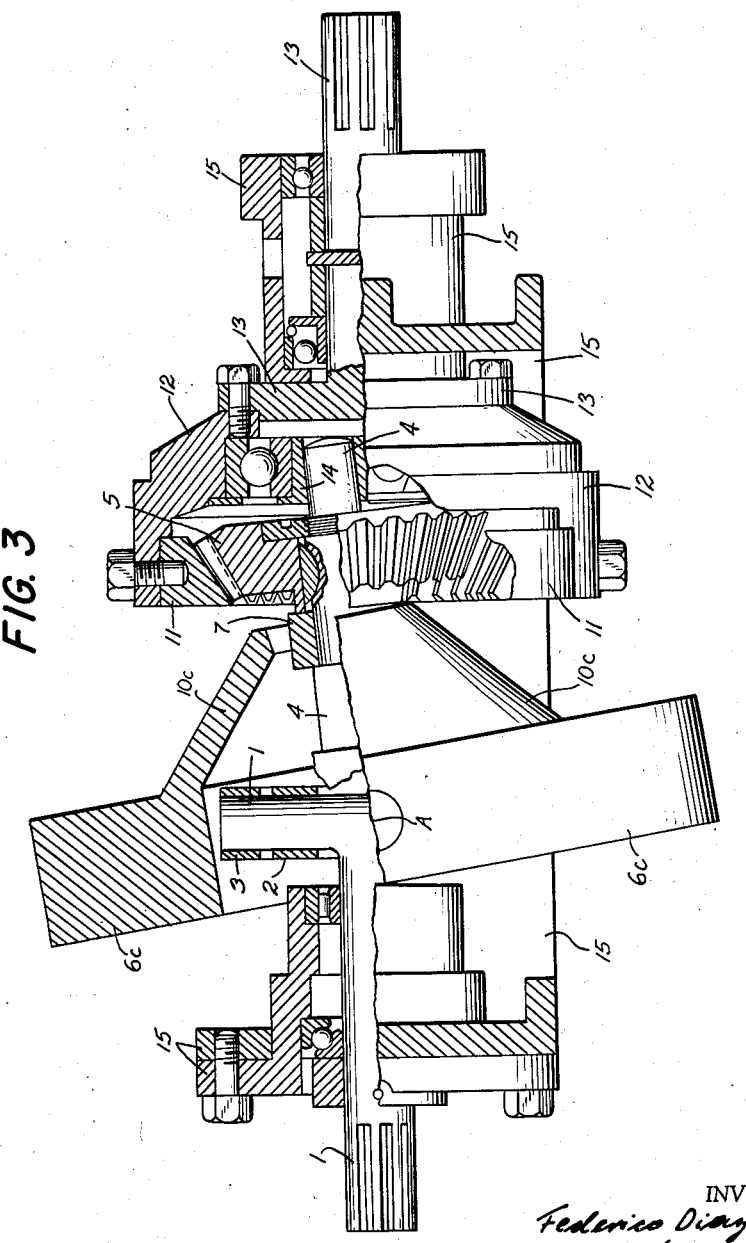
Fig. 3 is a partly sectional, side view of still another embodiment of a transmission apparatus constructed in accordance with the present invention.

A considerable simplification of the structures of Figs. 1 and 2 is illustrated in Fig. 3 according to which the flywheel 6c is carried only by the ring 3. Also in this embodiment of this invention the funnel-shaped member 10c is integral with the annular flywheel 6c. Except for these modifications the structure of Fig. 3 is identical with that of Figs. 1 and 2. Thus, with the embodiment of Fig. 3, the function of member 10c is limited to the same function as member 10a of Fig. 1, that is, the member 10c transfers to the flywheel 6c, by contact with the ring 7, all changes of position to which the short shaft 4 is subject during rolling of the planetary gear 5 around the gear 11.

The ring gear and the parts located between the same and the driven shaft 13 are shown in detail in Fig. 6C.

According to the embodiment of the invention as shown in Fig. 4, and illustrated in detail in Figs. 7A and 7B, the drive shaft 1 of Figs. 1–3 is replaced by an elongated drive shaft 1' having a transverse leg located intermediate its ends and carrying a single ring 3 which in and of itself supports the flywheel 6d and funnel-shaped member 10d which is integral with the flywheel, these parts operating in the same way as Figs. 1–3. The right free end portion of drive shaft 1' extends into a roller bearing carried by the head piece 12', and the head piece 12' is connected to the driven shaft 13' and the internal ring gear 11' in the same way as in the embodiments of Figs. 1–3, the sun gear 11' having inner peripheral teeth which are not beveled and which mesh with three planetary gears 20 which are supported for free rotation by the spider 18, these planetary gears 20 meshing with a sun gear 19 fixed to the shaft 1' for rotation therewith and being turnable within the ring of planetary gears 20.

The spider 18 is provided a cylindrical hub portion slidably engaging the drive shaft 1' and carrying the ring 7' which cooperates with the inner periphery of the smaller open end of member 10d in the manner described above. As is shown by the dotted lines in Fig. 4, the cylindrical hub portion of spider 18 is eccentric and is thicker at one side than on the opposite side. Thus, during free rolling of gears 20 on gear 11', the outermost portion of ring 7' moves in translation about the axis of shaft 1' to be engaged by member 10d in the same way that the shaft 4 causes ring 7 to engage members 10a, 10b, and 10c of Figs. 1–3, respectively, so that the structure of Fig. 4 produces the same results as the structure of Figs. 1–3.

Fig. 5 of the drawings shows an embodiment which requires no annular gear having inner peripheral teeth. The parts of Fig. 5 are shown in detail in Figs. 8A and 8B. According to the embodiment of Fig. 5, all of the structure is the same as that of Fig. 4 except that the planetary gears 20' are respectively integral with additional planetary gears 21 to form pairs of planetary gears which are supported for free rotation by the spider 18 which has an eccentric hub portion engaging shaft 1' in the same way as the spider 18 of Fig. 4. The planetary gears 21 are engaged by an annular member 24 which extends freely about a gear 22 fixed to and integral with the driven shaft 23 and meshing with the planetary gears 21. The central portion of gear 22 is hollowed out and is provided with a bearing into which the right free end portion of shaft 1' extends, as is clearly shown in Fig. 5.

It is believed to be evident that in the embodiment of Fig. 5 the same results will be produced as with the other embodiments of the invention, since when shaft 1' rotates slowly at idling speed, for example, the annular weight 6d cooperating with ring 7' through member 10d will be incapable of preventing free rolling of planetary gears 21 on sun gear 22. However, when the speed of rotation of shaft 1' increases, the member 10d will press with a far greater force against ring 7' to gradually restrain to an increasing extent movement of planetary gears 20' and 21 about the axis of shaft 1' so that the gear 22 will start to turn and so that eventually the planetary gears will turn only about their axes to provide a direct drive to the driven shaft 23.

It is believed to be evident that if it makes no difference whether or not the drive and driven shafts turn in opposite directions, then the structure of Fig. 5 can be considerably simplified.

In all embodiments of the invention, the driving and driven shafts are coaxial with each other and mounted one behind the other, and each shaft rotates independently in bearings located in the housing 15.

According to all embodiments of the invention there is a slight loss of revolutions at the driven shaft as compared with the drive shaft, since the difference in diameters between the planetary and sun gears produces such a loss. This lessening of speed may be compensated, however, through variations in the sizes of the gears of the conventional differential gears of the vehicle. Thus, with the structure of the invention the vehicle need not lose any speed.

With the above-described apparatus, it is possible to combine an auxiliary device which prevents free movement of the flywheel so that the transmission mechanism cannot transmit rotation from the driving to the driven shaft. Thus, with such an auxiliary device in its operative position, it is possible to race the engine of the vehicle, for example, without driving the vehicle. Such an auxiliary device may, for example, take the form of a conical ring device corresponding to ring 7 and being shiftable into the opening of the members 10a—10d to fill this opening and thereby prevent tilting of flywheel 6 relatively to member 7.

Also, it is possible to provide an additional auxiliary device to prevent any changes in the position of the planetary gears or intermediate shaft 4 in such a way that these elements are maintained in a predetermined position where they can rotate only about their axes. Such an auxiliary device maintains the apparatus in its direct drive position since there is a direct connection between the driving and driven shafts. Such an auxiliary device would be used only when a vehicle equipped with the apparatus of the invention is travelling along a substantially horizontal road and never when the vehicle is travelling up a hill, for example.

Also, it is necessary to combine with the apparatus of the invention a reversing mechanism to allow a vehicle to back up as well as to move forwardly, and a reversing mechanism of any known type may easily be associated with the apparatus of the invention.

The above-described progressive and automatic transmission mechanism may be made of any desired size. The advantages of the mechanism are:

(a) A large transfer of power to which the reduced weight and size of the apparatus contributes. Also, it is very significant that the flywheel of the engine may be used as the flywheel of the transmission mechanism, and vice versa.

(b) Large acceleration when vehicle is started as well as when the transmission speeds are changed because the total power of the engine comes into action.

(c) All hills are very easily traveled over because the speed relationships of the motor shaft may be very easily adapted to the speed of the driven shaft.

(d) Very easy control while driving along straight roads as well as while maneuvering curves and hills.

(e) A very simple construction with materials and elements suited for mass production.

It will be understood that each of the elements described above, or two or more together, may also find a useful application in other types of transmission apparatus differing from the types described above.

While the invention has been illustrated and described as embodied in automatic transmission apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Transmission apparatus comprising, in combination, support means; a drive shaft mounted for rotation about its own axis on said support means; a driven shaft coaxial with said drive shaft and being mounted for rotation about its own axis on said support means; a first gear fixed to said driven shaft for rotation therewith and being coaxial with said driven shaft; a planetary gear meshing with said first gear and being operatively connected to said drive shaft to be rotated thereby; mounting means mounting said planetary gear for free rolling movement along said first gear and about said axis of said drive shaft, said mounting means having a portion movable in translation with said planetary gear about said axis of said drive shaft; an annular weight extending about the axis of said drive shaft and being universally connected thereto for rotation with said drive shaft about the axis thereof so that said annular weight acts as a gyroscope rotor and tends to assume a predetermined stabilized position as the speed of rotation of said drive shaft increases; and abutment means connected to said weight for rotation therewith and pressing against said portion of said mounting means with an increasing force as the speed of rotation of said drive shaft increases and as said weight approaches said stabilized position thereof so as to gradually restrain said planetary gear against free rolling movement along said first gear as the speed of rotation of said drive shaft increases so that said planetary gear drives said first gear and driven shaft therewith as the speed of rotation of said drive shaft increases.

2. Transmission apparatus comprising, in combination, support means; a drive shaft mounted for rotation about its own axis on said support means; a driven shaft coaxial with said drive shaft and being mounted for rotation about its own axis on said support means; a first gear fixed to said driven shaft for rotation therewith and being coaxial with said driven shaft; a planetary gear meshing with said first gear and being operatively connected to said drive shaft to be rotated thereby; mounting means mounting said planetary gear for free rolling movement along said first gear and about said axis of said drive shaft, said mounting means having a portion movable in translation with said planetary gear about said axis of said drive shaft; an annular weight extending about the axis of said drive shaft and being universally connected thereto for rotation with said drive shaft about the axis thereof so that said annular weight acts as a gyroscope rotor and tends to assume a predetermined stabilized position as the speed of rotation of said drive shaft increases; and abutment means connected to said weight for rotation therewith and pressing against said portion of said mounting means with an increasing force as the speed of rotation of said drive shaft increases and as said weight approaches said stabilized position thereof so as to gradually restrain said planetary gear against free rolling movement along said first gear as the speed of rotation of said drive shaft increases so that said planetary gear drives said first gear and driven shaft therewith as the speed of rotation of said drive shaft increases, said abutment means being funnel-shaped and having opposite open ends of different sizes, the larger of said open ends being connected to said weight and the smaller of said open ends engaging said portion of said mounting means, and said abutment means being coaxial with said weight.

3. Transmission apparatus comprising, in combination, support means; a drive shaft mounted for rotation about its own axis on said support means; a driven shaft spaced from and coaxial with said drive shaft and also being mounted for rotation about its own axis on said support means; a first gear coaxial with said driven shaft and being fixed thereto for rotation therewith; a planetary gear meshing with said first gear; a third shaft coaxial with and fixed to said planetary gear, said third shaft having its axis intersecting the axis of said drive shaft at a predetermined point and said third shaft being universally connected to said drive shaft to be rotated thereby while being tiltable in all directions about said point; bearing means mounting said third shaft for free movement, as said drive shaft rotates, through a cone described by said axis of said third shaft and having its apex located at said point so that said bearing means maintains said planetary gear in mesh with said first gear while being freely rollable along the same; a ring located on said third shaft intermediate the ends thereof; an annular flywheel located about the axis of said drive shaft, having its center of gravity located at said point, and being universally connected to said drive shaft for rotation therewith and for free movement in all directions about said point so that said flywheel acts as a gyroscope rotor and tends to assume a predetermined stabilized position as the speed of rotation of said drive shaft increases; and a funnel-shaped portion having opposite open ends of different sizes and being coaxial with said flywheel, the larger of said open ends being fixed to said flywheel and the smaller of said open ends having its inner periphery extending about and located opposite said ring and having a diameter larger than the diameter of said ring and smaller than the diameter of the path through which said ring moves when the axis of said third shaft describes said cone so that said inner periphery of said smaller open end of said funnel-shaped portion presses against said ring with an increasing force as the speed of rotation of said drive shaft increases to gradually restrain said third shaft against free movement through said cone as said flywheel approaches said stabilized position thereof so as to gradually restrain said planetary gear against free rolling movement along said first gear so that said planetary gear drives said first gear and driven shaft therewith as the speed of rotation of said drive shaft increases.

4. Transmission apparatus comprising, in combination, support means; a T-shaped drive shaft having a first leg mounted for rotation about its own axis on said support means and having a second leg located at an end of said first leg and extending across the same; a driven shaft coaxial with said first leg of said drive shaft, also being mounted for rotation about its own axis on said support means, being spaced from said drive shaft, and being located on the side of said second leg opposite from said first leg of said drive shaft; an outer ring having its center located in the axis of said first leg of said drive shaft and being mounted on said second leg of said drive shaft for free movement about the axis of said second leg of said drive shaft; an inner ring located within said outer ring, having its center located in the axis of said first leg of said drive shaft, and also being mounted on said second leg for free movement about the axis thereof; an internal ring gear having inner peripheral teeth, having its center located in the axis of said driven shaft, being located between said drive and driven shafts, and being fixed to said driven shaft for rotation therewith; a cylindrical bearing block mounted between said ring gear and driven shaft for rotation about its own axis, being coaxial with said driven shaft, and being formed with a bore inclined to the axis of said driven shaft and having an axis passing through the point of intersection of the axes of said first and second legs of said drive shaft; a third shaft coaxial with said bore of said bearing block, having an end portion extending into said bore and slidably engaging said bearing block, and being connected to said inner ring for free turning movement about an axis passing through said point and being normal to the axes of said first and second legs of said drive shaft; a planetary gear fixed to said third shaft for rotation therewith and meshing with said ring gear; a third ring mounted on said third shaft and being located between said planetary gear and drive shaft; an annular flywheel located about said drive shaft, having its center of gravity located at said point, and being connected to said outer ring for free movement about an axis passing through said point and being normal to said axes of said first and second legs of said drive shaft; and a funnel-shaped portion having opposite open ends of different sizes, being coaxial with said flywheel, being fixed at the larger of its open ends to said flywheel, and having the inner periphery of the smaller of its open ends extending with a predetermined clearance about said third ring to engage the latter as said flywheel approaches a position of stability during an increase in the speed of rotation of said drive shaft.

5. Transmission apparatus as defined in claim 4 and wherein said flywheel includes an annular projection on the side thereof opposite from said funnel-shaped portion, said annular projection being coaxial with said flywheel; a fourth ring coaxial with said flywheel, extending with clearance about the same, and being mounted on said support means for free turning movement about an axis normal to the axis of said driven shaft and passing through said point; and bearing means pivotally connected to said fourth ring and engaging the outer surface of said annular projection.

6. Transmission apparatus as defined in claim 4 and wherein said funnel-shaped portion has said larger open end thereof fixed to said flywheel through the medium of an annular portion integral with said flywheel and funnel-shaped portion and being coaxial with said flywheel; a fourth ring coaxial with said flywheel, extending with clearance about the same, and being mounted on said support means for free turning movement about an axis normal to the axis of said driven shaft and passing through said point; and bearing means pivotally connected to said fourth ring and engaging the outer surface of said annular portion.

7. Transmission apparatus comprising, in combination, support means; a drive shaft having a first leg mounted for rotation about its own axis on said support means and having a second leg extending across said first leg intermediate the ends thereof; a driven shaft coaxial with and spaced from said first leg of said drive shaft and also being mounted for rotation about its own axis on said support means; a first ring having its center located in the axis of said first leg of said drive shaft and being mounted on said second leg of said drive shaft for free movement about the axis of said second leg; an internal ring gear having its center located in the axis of said driven shaft, having inner peripheral teeth, and being fixed to said driven shaft for rotation therewith; a second sun gear located within said ring gear, being coaxial therewith, and being fixed to said first leg of said drive shaft to be rotated thereby; a plurality of planetary gears meshing with said ring and sun gears; a spider supporting said planetary gears for free rotation about their axes, respectively, and having an eccentric hub portion slidably engaging said first leg of said drive shaft; a second ring located on said eccentric hub portion; an annular flywheel having its center of gravity located at the intersection of the axes of said first and second legs of said drive shaft and being mounted on said first ring for free turning movement about an axis normal to said axes of said first and second legs and passing through the point of intersection thereof; and a funnel-shaped portion having opposite open ends of different diameters and being coaxial with said flywheel, said funnel-shaped portion being fixed at the larger of its open ends to said flywheel and having the inner periphery of the smaller of its open ends located with a predetermined clearance about said second ring to press against the same with an increasing force as the speed of rotation of said drive shaft increases to cause said flywheel to approach a predetermined stabilized position.

8. Transmission apparatus comprising, in combination, support means; a drive shaft having a first leg mounted for rotation about its own axis on said support means and having a second leg extending across said first leg intermediate the ends thereof; a driven shaft coaxial with and spaced from said first leg of said drive shaft and also being mounted for rotation about its own axis on said support means; a first ring having its center located in the axis of said first leg of said drive shaft and being mounted on said second leg of said drive shaft for free movement about the axis of said second leg; a first sun gear having its center located in the axis of said driven shaft and being fixed to that end of said driven shaft which is nearest to said drive shaft; a second sun gear having its center located in the axis of said first leg of said drive shaft and being fixed to said first leg of said drive shaft adjacent that end of said first leg which is nearest to said driven shaft; a plurality of first planetary gears meshing with said first sun gear; a plurality of second planetary gears meshing with said second sun gear and being respectively fixed to and coaxial with said plurality of first planetary gears so as to form pairs of first and second planetary gears each of which rotates as a unit; a spider supporting said pairs of planetary gears for free rotation about their axes, respectively, and having an eccentric hub portion slidably engaging said first leg of said drive shaft; a second ring located on said eccentric hub portion; an annular flywheel having its center of gravity located at the intersection of the axes of said first and second legs of said drive shaft and being mounted on said first ring for free turning movement about an axis normal to said axes of turning movement about an axis normal to said axes of said first and second legs and passing through the point of intersection thereof; and a funnel-shaped portion having opposite open ends of different diameters and being coaxial with said flywheel, said funnel-shaped portion being fixed at the larger of its open ends to said flywheel and having the inner periphery of the smaller of its open ends located with a predetermined clearance about said second ring to press against the same with an increasing force as the speed of rotation of said drive shaft increases to cause said flywheel to approach a predetermined stabilized position.

9. Transmission apparatus comprising, in combination, support means; a drive shaft mounted for rotation about its own axis on said support means; a driven shaft coaxial with said drive shaft and being mounted for rotation about its own axis on said support means; a first gear fixed to said driven shaft for rotation therewith and being coaxial with said driven shaft; a planetary gear meshing with said first gear and being operatively connected to said drive shaft to be rotated thereby; mounting means mounting said planetary gear for free rolling movement along said first gear and about said axis of said drive shaft, said mounting means having a portion movable in translation with said planetary gear about said axis of said drive shaft; and annular weight extending about the axis of said drive shaft and being universally connected thereto for rotation with said drive shaft about the axis thereof so that said annular weight acts as a gyroscope rotor and tends to assume a predetermined stabilized position as the speed of rotation of said drive shaft increases, said annular flywheel forming a flywheel for an engine which turns said drive shaft; and abutment means connected to said weight for rotation therewith and pressing against said portion of said mounting means with an increasing force as the speed of rotation of said drive shaft increases and as said weight approaches said stabilized position thereof so as to gradually restrain said planetary gear against free rolling movement along said first gear as the speed of rotation of said drive shaft increases so that said planetary gear drives said first gear and driven shaft therewith as the speed of rotation of said drive shaft increases.

10. Transmission apparatus comprising, in combination, support means; a drive shaft mounted for rotation about its own axis on said support means; a driven shaft mounted for rotation on its own axis on said support means; rotation transmitting means extending between and being connected to said drive and driven shafts for transmitting rotation from said drive shaft to said driven shaft, said rotation transmitting means including a portion connected to said drive shaft for movement in translation about the axis of said drive shaft; a flywheel universally connected to said drive shaft to be rotated thereby so that said flywheel acts as a gyroscope rotor and approaches a stabilized position where the rotational axis of said flywheel is coaxial with said drive shaft as the speed of rotation of said drive shaft increases; and means connected to said flywheel for rotation therewith and engaging said portion of said rotation transmitting means to prevent said flywheel from arriving at said stabilized position where the rotational axis of said flywheel is coaxial with said drive shaft.

References Cited in the file of this patent

UNITED STATES PATENTS

| | | |
|---|---|---|
| 1,914,865 | Roth | June 20, 1933 |
| 2,310,724 | Whitlow | Feb. 9, 1943 |
| 2,639,631 | Taylor | May 26, 1953 |